United States Patent
Lin

(10) Patent No.: US 7,340,398 B2
(45) Date of Patent: Mar. 4, 2008

(54) SELECTIVE SAMPLING FOR SOUND SIGNAL CLASSIFICATION

(75) Inventor: Xiaofan Lin, San Jos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 944 days.

(21) Appl. No.: 10/645,210

(22) Filed: Aug. 21, 2003

(65) Prior Publication Data

US 2005/0043957 A1    Feb. 24, 2005

(51) Int. Cl.
*G10L 11/00* (2006.01)
*G10L 15/20* (2006.01)

(52) U.S. Cl. .................... 704/270; 704/233
(58) Field of Classification Search ................ None
See application file for complete search history.

(56) References Cited

U.S. PATENT DOCUMENTS

| | | | | |
|---|---|---|---|---|
| 5,583,961 A | * | 12/1996 | Pawlewski et al. | 704/241 |
| 5,596,679 A | * | 1/1997 | Wang | 704/236 |
| 5,865,626 A | * | 2/1999 | Beattie et al. | 434/185 |
| 6,122,615 A | * | 9/2000 | Yamamoto | 704/252 |
| 6,442,519 B1 | * | 8/2002 | Kanevsky et al. | 704/243 |
| 6,665,644 B1 | * | 12/2003 | Kanevsky et al. | 704/275 |
| 6,901,362 B1 | * | 5/2005 | Jiang et al. | 704/214 |

OTHER PUBLICATIONS

Kittler et al., "On Combining Classifiers", IEEE Transaction on Pattern Analysis and Machine Intelligence, vol. 20, No. 3, Mar. 1998, pp. 226-239.*
Fussell, "Automatic sex identification from short segments of speech", ICASSP-91, pp. 409-412.*
Chan et al., "Classification of speech accents with neural networks", IEEE International Conference on Neural Networks, vol. 7, 1994, pp. 4483-4486.*

* cited by examiner

*Primary Examiner*—Brian L. Albertalli

(57) ABSTRACT

A system and method of selective sampling for sound signal classification is disclosed. The method of the present invention discloses the elements of: receiving a sound signal; specifying meta-data to be extracted from the sound signal; dividing the sound signal into a set of frames; applying a fitness function to the frames to create a set of fitness data; selecting a frame from the set of frames, if the frame's corresponding fitness datum within the set of fitness data exceeds a predetermined threshold value; extracting the meta-data from the selected frames; and classifying the sound signal based on the meta-data extracted from the selected frames. The system of the present invention discloses means for implementing the method.

19 Claims, 4 Drawing Sheets

200

Fitness Data

| Frame Number | Meta-Data Class #1 | Meta-Data Class #2 | ... | Meta-Data Class #n |
|---|---|---|---|---|
| 1 | 8.5 | | | |
| 2 | 7.0 | | | |
| 3 | 9.6 | | | |
| 4 | 11.0 | | | |
| 5 | 12.0 | | | |
| 6 | 5.0 | | | |
| 7 | 4.0 | | | |
| 8 | 2.0 | | | |
| 9 | 1.0 | | | |
| 10 | 1.0 | | | |

SELECTIVE SAMPLING FOR SOUND SIGNAL CLASSIFICATION

BACKGROUND OF THE INVENTION

1. Field of the Invention

The present invention relates generally to systems and methods for sound signal classification, and more particularly to selective sampling techniques for sound signal classification.

2. Discussion of Background Art

Interactive Voice Response (IVR) systems are an increasingly important tool for providing information and services in a more cost efficient manner. IVR systems are typically hosted by a server, which includes an array of Digital Signal Processors (DSPs), and enable speakers to interact with corporate databases and services over a telephone using a combination of voice utterances and telephone button presses. IVR systems are particularly cost effective when a large number of speakers require data or services that are very similar in nature and thus can be handled in an automated manner. A speaker using an IVR system may or may not eventually be connected to a live operator, depending upon the complexity of the speaker's request.

Due to the significant cost savings often realized with IVR systems, there is a growing demand for such systems to provide more functionality and a richer speaker experience. Toward those ends, IVR systems responsive to a speaker's age range, gender, language, accent, dialect, identity, and so on are desirable. Such functionality often is possible when a speaker's vocal utterance (a.k.a. speech or sound signal) is first digitized and then analyzed, so that a set of meta-data (e.g. the speaker's age range, and so on) can be extracted from the utterance, without requiring the speaker to provide such information directly to the IVR system.

While such meta-data extraction has a potential to improve speech recognition of the speaker and enable some novel IVR applications directed to a speaker's particular characteristics, current techniques for meta-data extraction are very computationally intensive and have further burdened IVR system servers and support hardware to the point of creating speed bottlenecks even during normal use.

What is needed is a system and method for sound signal classification that overcomes the problems of the prior art.

SUMMARY OF THE INVENTION

The present invention is a system and method for sound signal classification. The method of the present invention includes the elements of: receiving a sound signal; specifying meta-data to be extracted from the sound signal; dividing the sound signal into a set of frames; applying a fitness function to the frames to create a set of fitness data; selecting a frame from the set of frames, if the frame's corresponding fitness datum within the set of fitness data exceeds a predetermined threshold value; extracting the meta-data from the selected frames; and classifying the sound signal based on the meta-data extracted from the selected frames. The system of the present invention includes means for implementing the method.

These and other aspects of the invention will be recognized by those skilled in the art upon review of the detailed description, drawings, and claims set forth below.

BRIEF DESCRIPTION OF THE DRAWINGS

FIG. 2 is one example of a data structure for maintaining a set of fitness data.

DETAILED DESCRIPTION OF THE PREFERRED EMBODIMENT

The present invention discusses a selective frame sampling technique for extracting, from a speaker's voice utterance/speech/sound signal, meta-data such as age range, gender, language, accent, dialect, and identity. The invention not only increases the speed at which an Interactive Voice Response (IVR) system can extract meta-data from (i.e. classify) a speaker's sound signal, but also the accuracy of the extracted meta-data.

Figure 1:
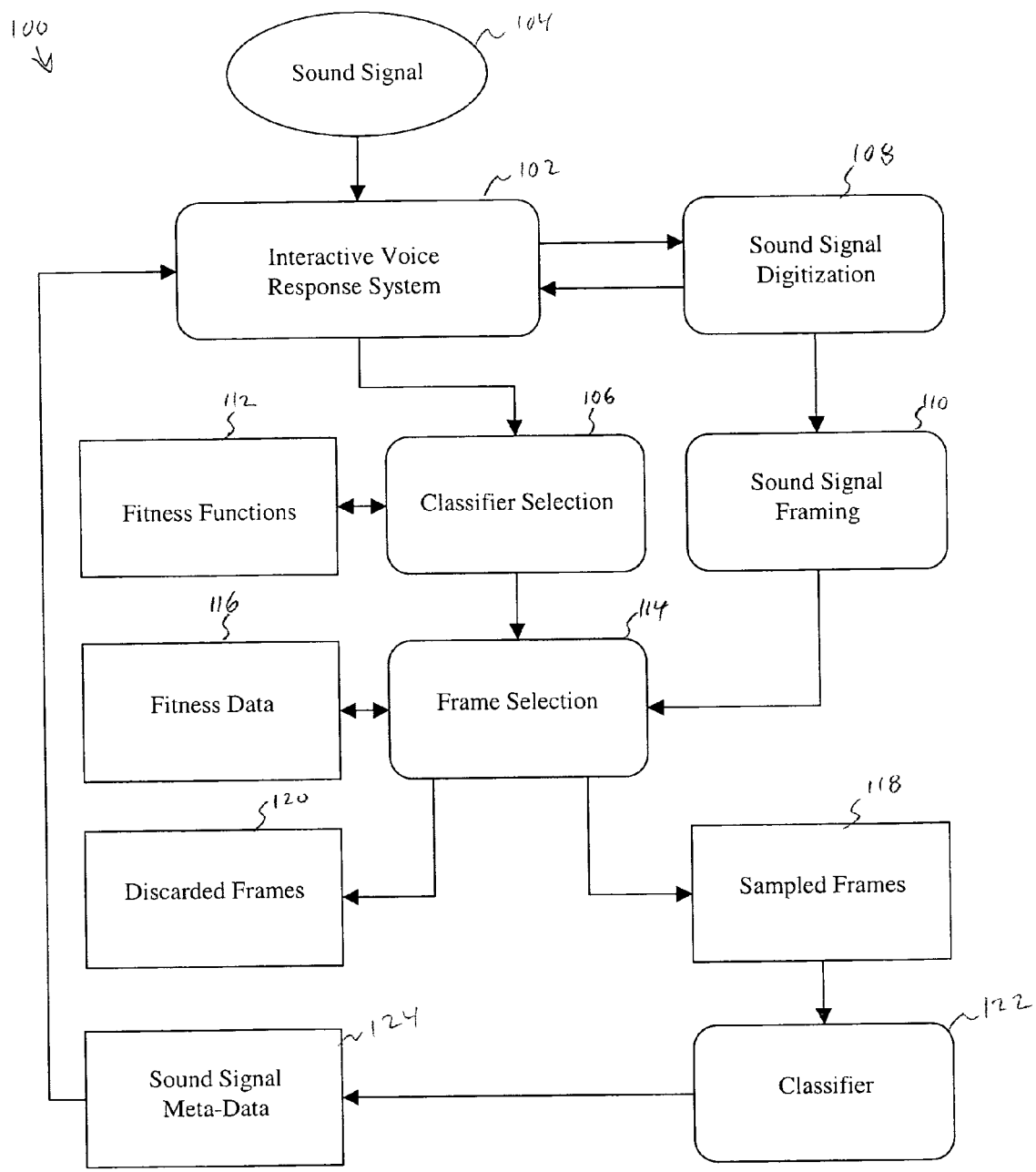
FIG. 1 is a dataflow diagram of one embodiment of a system for sound signal classification.
Figure 3A:
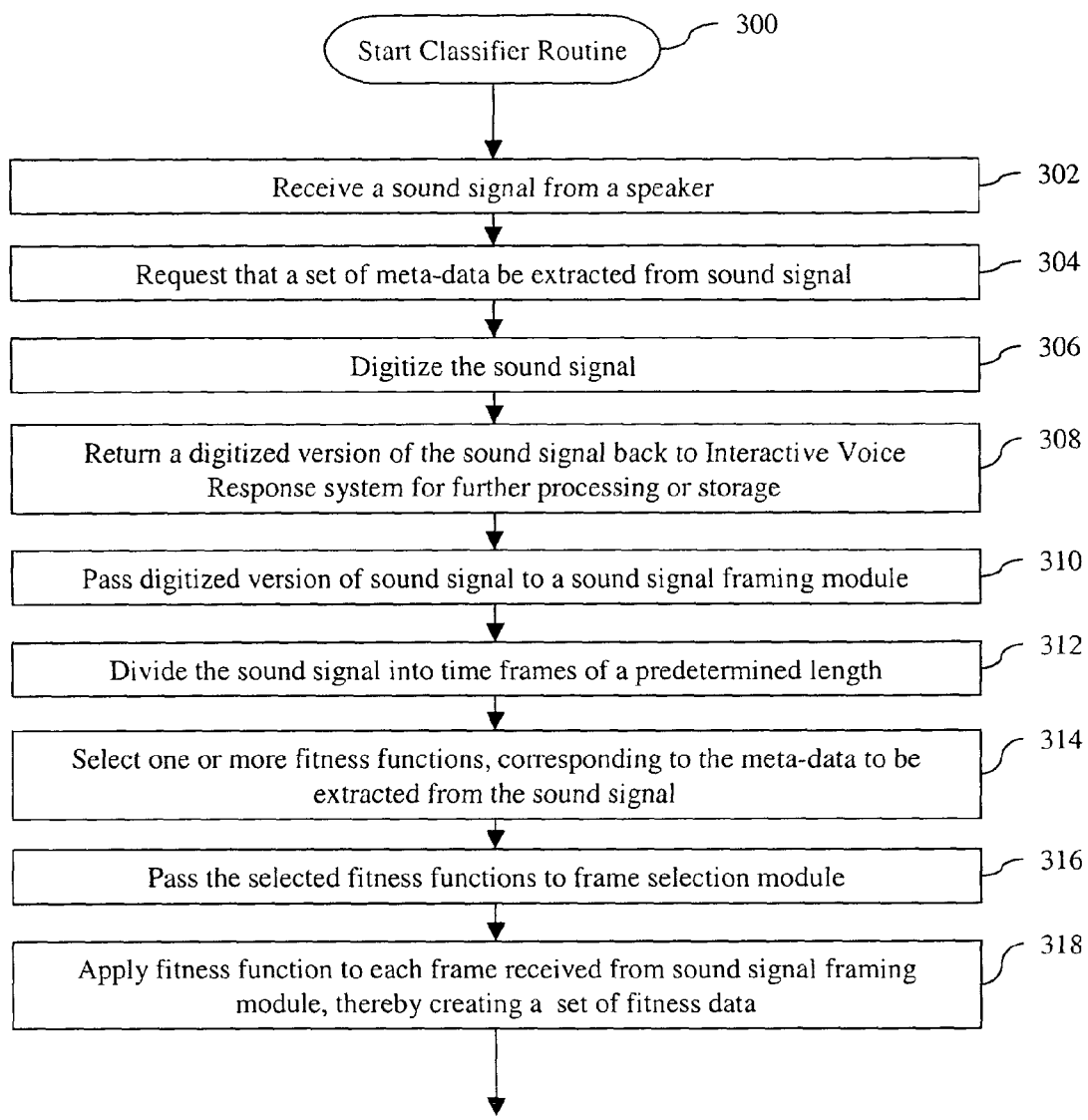
FIGS. 3A and 3B are a flowchart of one embodiment of a method for sound signal classification.
Figure 3B:
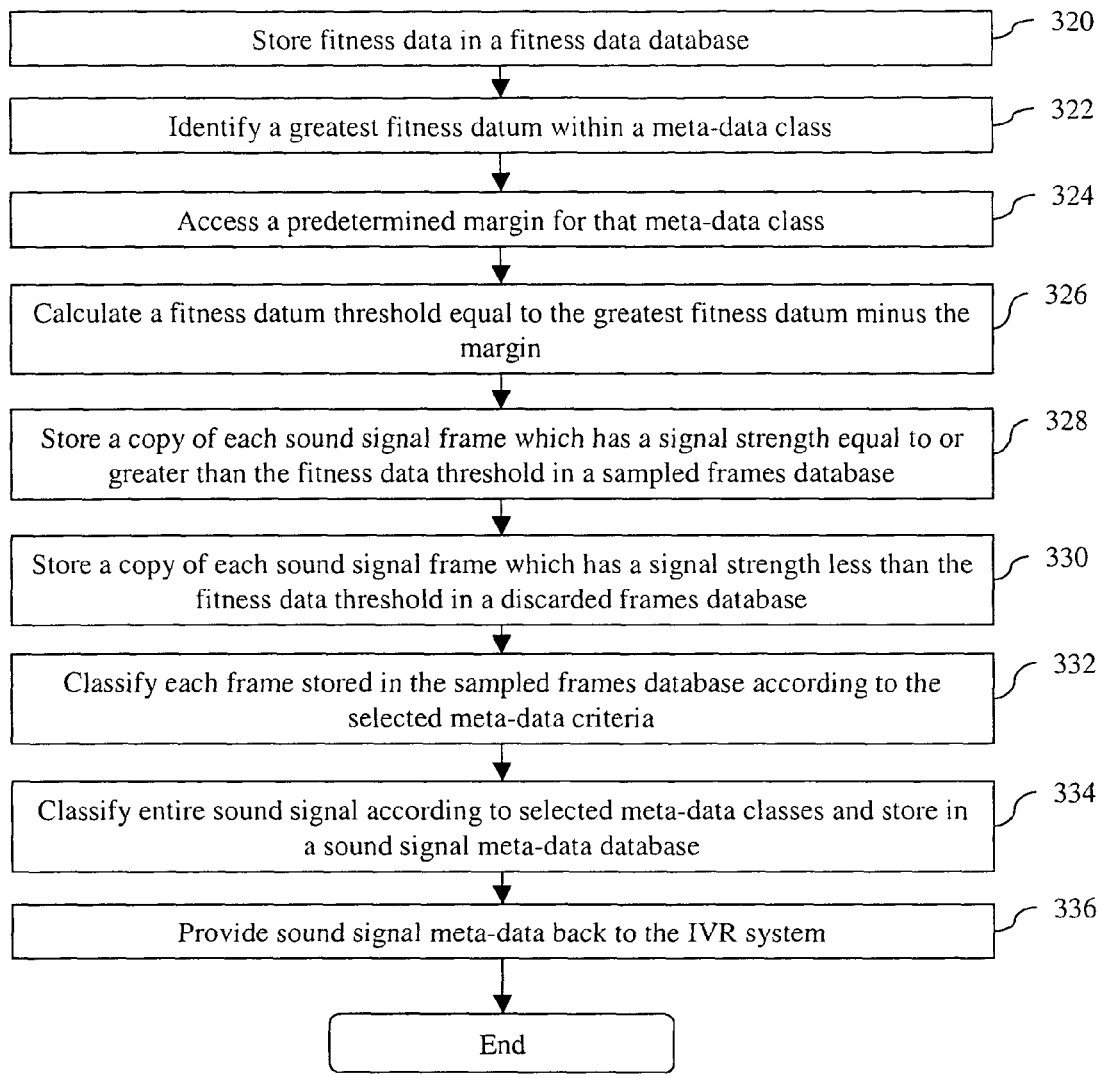

FIG. 1 is a dataflow diagram of one embodiment of a system 100 for sound signal classification. FIG. 2 is one example of a data structure 200 for maintaining a set of fitness data. FIG. 3A and 3B are a flowchart of one embodiment of a method 300 for sound signal classification. FIGS. 1, 2, 3A, and 3B are now discussed together.

In step 302, an IVR system 102 receives a vocal utterance/speech/sound signal 104 from a speaker. The sound signal 104 will most commonly include of human utterances, such as words, phrases, and sentences. However, the sound signal 104 may also include sounds made from a recording, an animal, an inanimate object, and a computer synthesizer. In step 304 the IVR system 102 sends a meta-data request to a classifier selection module 106. The meta-data request specifies what classes of meta-data shall be extracted from the sound signal 104 for a speaker who authored the sound signal 104. The meta-data classes include: age range, gender, language, accent, dialect, identity, and so on. Those skilled in the art, however, will recognize that different types of meta-data may be extracted from the non-human speech/sound signals listed above.

In step 306, the IVR system 102 passes the sound signal 104 to a sound signal digitization module 108. The digitization module 108 includes one or more Digital Signal Processors for converting analog sound signals into a digitized form and performing additional processing on the sound signal 104 if necessary. The additional processing may include sound signal noise reduction, echo cancellation, speech detection, and so on. In step 308, the digitization module 108 passes a digitized version of the sound signal 104 back to the IVR system 102 for further processing or storage, depending upon how the IVR system 102 is designed. In step 310, the digitization module 108 passes a digitized version of the sound signal 104 on to a sound signal framing module 110. In step 312, the framing module 110 divides the sound signal 104 into time frames of a predetermined length. Preferably the time frames are of equal length.

In step 314, the classifier selection module 106 selects one or more fitness functions, from a fitness function database 112, corresponding to the meta-data to be extracted from the sound signal 104. A fitness function is herein defined as a mathematical calculation to be performed on one or more sound signal frames.

While a different fitness function may be used for each class of meta-data to be resolved, preferably a single fitness function that calculates each frame's overall sound signal strength is used. The sound signal strength of a frame is herein defined in the alternative to be: the frame's total signal power, an average of peak amplitudes within the frame, a total energy within the frame, a frame volume equal to a logarithmic value of the sound signal's amplitude, and so on, depending upon a particular implementation of the present invention.

In step 316, the classifier selection module 106 passes the selected fitness functions to a frame selection module 114. In step 318, the frame selection module 114 applies each of the selected fitness functions individually to each frame received from the sound signal framing module 110, thereby creating the set of fitness data 200. In step 320, the frame selection module 114 stores the fitness data in a fitness data database 116.

FIG. 2 shows one example of the data structure 200 for maintaining the set of fitness data. In the example data structure 200, the sound signal 104 has been divided into ten separate frames, labeled by "frame number." A set of fitness data is calculated for each of the meta-data classes (e.g. age range, gender, accent, etc.). An exemplary set of fitness data for meta-data class #1 is shown, and will be used to illustrate the method steps that follow.

Generally, the frame selection module 114 preferably identifies a sub-set of the sound signal frames from which the selected meta-data may be accurately extracted. The preferred method selects those sound signal frames that have a greatest relative signal strength for further meta-data extraction.

Specifically, in step 322, the frame selection module 114 identifies a greatest fitness datum within a meta-data class (e.g. Frame 5 having a value of 12.0 in the example). In step 324, the frame selection module 114 accesses a predetermined margin (e.g. a margin of 2 in the example) for that meta-data class from the classifier selection module 106. This "margin" effectively sets a sampling rate for the meta-data class. In step 326, the frame selection module 114 calculates a fitness datum threshold equal to the greatest fitness datum minus the margin (e.g. 12.0 minus 2=10.0 in the example).

In step 328, the frame selection module 114 stores a copy of each digitized sound signal frame that has a signal strength equal to or greater than the fitness data threshold (e.g. Frames 4 and 5 in the example) in a sampled frames database 118. In step 330, the frame selection module 114 stores a copy of each digitized sound signal frame that has a signal strength less than the fitness data threshold (e.g. Frames 1-3 and 6-10 in the example) in a discarded frames database 120. Alternatively, the frame selection module 114 could just delete these discarded frames. Typically a sound signal's middle frames have a higher Signal-to-Noise Ratio (SNR) (i.e. signal strength) when compared with the sound signal's leading and trailing frames, and thus most often become the sampled frames stored in the sampled frames database 118. As a quick second example, if the margin was set to 4, then the threshold would be 12.0 minus 4=8, and Frames 1, 3, 4, and 5 would have been stored in the sampled frames database 118.

In step 332, a classifier module 122 classifies each frame stored in the sampled frames database 118 according to the selected meta-data criteria. In one embodiment of the present invention, the classifier 122 uses a Multi-Layer Perceptron (MLP) neural network trained to recognize the meta-data class patterns.

If the sound signal 104 is a speech signal, the MLP neural network will typically have at least three layers: an input layer with 12 nodes, corresponding to the 12 Mel-Cepstral components of a speech signal; a hidden layer with 20 nodes; and an output layer with a number of nodes corresponding to each class within the meta-data class (e.g. 2 nodes, "male" and "female," if the meta-data class is "gender"). Back propagation (BP) is used to train the neural network. After being trained on a ground-truth set of about 200,000 frames, the classifier 122 can achieve a meta-data class recognition rate of about 70% for a gender meta-data class at the frame level.

Next, in step 334, after having classified each of the sound signals' 104 sampled frames individually, the classifier module 122 classifies the entire sound signal 104 according to the selected meta-data classes and stores the result in a sound signal meta-data database 124.

One way to classify the entire sound signal 104 is by voting. Voting classifies the sound signal 104 based on which meta-data class is supported by a greatest number of the sampled frames.

However, a preferred method for classifying the entire sound signal 104 adds together each of the sampled frame's confidence scores, which were generated by the neural network. That meta-data class with a highest overall total confidence score is chosen as the final class for the entire sound signal 104. The confidence score approach results in a lower classification "error rate," and is even more effective as the "selective sampling" rate is decreased.

Another approach classifies the entire sound signal 104 as that class having a statistically longest run-length. The run length of a class is equal to a longest number of continuous sampled frames having been assigned a same meta-data class.

Then, in step 336, the sound signal meta-data 124 for the sound signal 104 is provided to the IVR system 102. IVR systems can benefit from such meta-data in a variety of ways, including: improved customer service; added IVR system functionality; and improved statistical record keeping.

Empirical tests comparing the present invention's selective sampling to even sampling were run on about 1,200 speech files in a "Test" directory of TIDIGITS corpus. There were about 250,000 frames in total. "Even sampling" is herein defined as when the sampled frames from a sound signal are equally spaced with respect to each other, independent of their signal strength. For example, if the "sampling rate" is 1:3, then "even sampling" will select Frames 1, 4, 7, and 10 in FIG. 2, while "selective sampling" will select Frames 1, 3, 4, and 5.

It was found that regardless of the "sampling rate", the present invention's "selective sampling" achieved a lower sound signal meta-data 124 error rate when compared to "even sampling." It was also found that there was general "sweet sampling rate spot" for "selective sampling" between 1:2 and 1:3, for gender meta-data classes. Sampling rates greater than 1:2 tended to include too many low quality sound signal frames, while sampling rates lower than 1:3 tended to discard too many high quality sound signal frames. Those frames discarded by selective sampling also tend to have a lower confidence score than the sampled sound signal frames. Also, since not all of the sound signal's frames are analyzed by the classifier module 122, the speed with which the sound signal meta-data 124 is calculated is also increased.

While one or more embodiments of the present invention have been described, those skilled in the art will recognize that various modifications may be made. Variations upon and modifications to these embodiments are provided by the present invention, which is limited only by the following claims.

What is claimed is:

1. A method for sound signal classification, comprising:
receiving a sound signal;
specifying meta-data to be extracted from the sound signal;
dividing the sound signal into a set of frames;
applying a fitness function to the frames to create a set of fitness data;
selecting a frame from the set of frames, if the frame's corresponding fitness datum within the set of fitness data exceeds a predetermined threshold value;
extracting the meta-data from the selected frames; and
classifying the sound signal based on the meta-data extracted from the selected frames;
wherein the selecting includes selecting a frame for in meta-data extraction, if the frame's fitness datum exceeds a greatest fitness datum within the set of fitness data minus a predetermined margin.

2. The method of claim 1:
wherein the sound signal is a speech signal.

3. The method of claim 1 wherein specifying includes:
specifying age range meta-data.

4. The method of claim 1 wherein specifying includes:
specifying gender meta-data.

5. The method of claim 4 wherein selecting includes:
setting the threshold so that a ratio of frames selected to frames not selected is between about 1:2 and about 1:3.

6. The method of claim 1 wherein specifying includes:
specifying accent meta-data.

7. The method of claim 1 wherein specifying includes:
specifying dialect meta-data.

8. The method of claim 1 wherein specifying includes:
specifying identity meta-data.

9. The method of claim 1 wherein dividing includes:
dividing the sound signal into a set of time frames.

10. The method of claim 1 wherein dividing includes:
dividing the sound signal into a set of equal length time frames.

11. The method of claim 1 wherein applying includes:
calculating a signal strength of the sound signal frame.

12. The method of claim 1 wherein extracting includes:
extracting the meta-data from the selected flames using a Multi-Layer Perceptron (MLP) neural network.

13. The method of claim 12 wherein extracting includes:
extracting the meta-data from the selected frames using a MLP neural network having an input layer with nodes corresponding to the sound signal's Mel-Cepstral components.

14. The method of claim 1 further wherein classifying includes:
assigning the sound signal to that meta-data class to which a largest number of the selected frames have been assigned.

15. The method of claim 1 further wherein classifying includes:
adding together each of the selected frame's confidence scores for each meta-data class; and
assigning the sound signal to that meta-data class having a highest total confidence score.

16. The method of claim 1 further wherein classifying includes:
assigning the sound signal to that meta-data class having a statistically longest run-length.

17. A method for sound signal classification comprising:
receiving a speech signal;
specifying meta-data to be extracted from the sound signal;
dividing the sound signal into a set of equal length time frames;
applying a fitness function to the frames to create a set of fitness data;
selecting a frame for meta-data extraction; if the frame's fitness datum exceeds a greatest fitness datum within the set of fitness data minus a predetermined margin;
extracting the meta-data from the selected frames using a Multi-Layer Perceptron (MLP) neutral network;
adding together each of the selected frame's confidence scores for each meta-data class; and
assigning the sound signal to that meta-data class having a highest total confidence score.

18. A system for sound signal classification comprising:
means for receiving a sound signal;
means for specifying meta-data to be extracted from the sound signal;
means for dividing the sound signal into a set of frames;
means for applying a fitness function to the frames to create a set of fitness data;
means for selecting frame from the set of frames, if the frame's corresponding fitness datum within the set of fitness data exceeds a predetermined threshold value, the means for selecting includes means for setting the predetermined threshold value so that a ratio of frames selected to frames not selected is between about 1:2 and about 1:3;
means for extracting the meta-data from the selected frames; and
moans for classifying to sound signal based on the meta-data extracted from the selected frames.

19. The method of claim 17 wherein selecting includes:
setting the threshold so that a ratio of frames selected to frames not selected is between about 1:2 and about 1:3.

* * * * *

UNITED STATES PATENT AND TRADEMARK OFFICE
CERTIFICATE OF CORRECTION

PATENT NO.       : 7,340,398 B2  Page 1 of 1
APPLICATION NO.  : 10/645210
DATED            : March 4, 2008
INVENTOR(S)      : Xiaofan Lin It is certified that error appears in the above-identified patent and that said Letters Patent is hereby corrected as shown below:

In column 5, line 18, in Claim 1, after "frame for" delete "in".

In column 5, line 45, in Claim 12, delete "flames" and insert -- frames --, therefor.

In column 6, line 14, in Claim 17, after "classification" insert -- , --.

In column 6, line 22, in Claim 17, after "extraction" delete ";" and insert -- , --, therefor.

In column 6, line 26, in Claim 17, delete "neutral" and insert -- neural --, therefor.

In column 6, line 38, in Claim 18, after "selecting" insert -- a --.

In column 6, line 47, in Claim 18, delete "moans" and insert -- means --, therefor.

In column 6, line 47, in Claim 18, after "classifying" delete "to" and insert -- the --, therefor.

Signed and Sealed this

Twenty-third Day of June, 2009

JOHN DOLL
*Acting Director of the United States Patent and Trademark Office*